United States Patent [19] Dresner et al.

[11] 4,091,144

[45] May 23, 1978

[54] ARTICLE WITH ELECTRICALLY-RESISTIVE GLAZE FOR USE IN HIGH-ELECTRIC FIELDS AND METHOD OF MAKING SAME

[75] Inventors: Joseph Dresner, Princeton; Kenneth Warren Hang, East Windsor, both of N.J.

[73] Assignee: RCA Corporation, New York, N.Y.

[21] Appl. No.: 689,266

[22] Filed: May 24, 1976

[51] Int. Cl.[2] ........................ B32B 17/06; H01C 8/00; B32B 5/16

[52] U.S. Cl. .................................... 428/328; 252/518; 338/308; 427/101; 428/427; 428/428; 428/432; 428/403

[58] Field of Search ............................. 252/518, 518.1; 428/432, 328, 428, 403, 427; 427/101; 338/308

[56] References Cited

U.S. PATENT DOCUMENTS

| | | | |
|---|---|---|---|
| 2,564,707 | 8/1951 | Mochel | 252/518.1 |
| 2,717,946 | 9/1955 | Peck | 252/518.1 |
| 3,044,901 | 7/1962 | Garnsworthy | 252/518.1 |
| 3,669,907 | 6/1972 | Kohashi | 252/518.1 |
| 3,795,499 | 3/1974 | Ogawa | 65/60 D |
| 3,923,698 | 12/1975 | Kamigaito | 252/518.1 |

OTHER PUBLICATIONS

Burkett, R. H. W., "Tin Oxide Resistors," *J. Brit. I.R.E.*, Apr. 1961, pp. 301-304.

Dearden, J., "High Valve, High Voltage Resistors," *Electronic Components*, Mar. 1967, pp. 259-263.

*Primary Examiner*—Ellis Robinson

*Attorney, Agent, or Firm*—G. H. Bruestle; L. Greenspan

[57] ABSTRACT

A substrate, such as a ceramic body, carries a layer of glaze consisting essentially of (a) an inorganic oxide glass matrix that is essentially free from ions which migrate in a high-electric field, (b) about $1 \times 10^{19}$ to $50 \times 10^{19}$ antimony cations distributed in each cubic centimeter of the glass matrix, and (c) about 4 to 30 weight percent with respect to the weight of said glaze of discrete tin-oxide particles in the antimony-containing glass matrix. The method comprises dissolving antimony, as a compound thereof, in a glass, mixing together particles of said glass and tin-oxide particles, coating the mixture on a substrate, heating the coated substrate to melt the glass particles while retaining tin oxide in discrete particulate form, and then solidifying the molten coating.

7 Claims, 4 Drawing Figures

ARTICLE WITH ELECTRICALLY-RESISTIVE GLAZE FOR USE IN HIGH-ELECTRIC FIELDS AND METHOD OF MAKING SAME

BACKGROUND OF THE INVENTION

This invention relates to a novel article of manufacture carrying an electrically-resistive glaze whose properties are stable in high-electric fields, and to methods for preparing said article particularly for use in an electrical device.

There are many applications in which a body carrying an electrically-resistive glaze operates either continuously or intermittently in a high-electric field; that is, a field of 10 kilovolts per centimeter or higher. In one application, for example, a resistive glaze on a ceramic substrate is used in an electron gun for a cathoderay tube to provide a graded or distributed electric field (or electronic lens) for acting on an electron beam. In some forms of this gun, a resistive glaze is coated upon an insulating support such as a ceramic body, and the glaze distributes the voltage along the beam path either directly or through spaced conductors. These latter structures are sometimes referred to as "resistive lenses."

In this and similar applications, the resistive glaze must have a particular combination of properties which are not available with known prior glazes. Besides the usual requirements of low cost and ease of fabrication, the resistive glaze must have a sheet resistance in the range of about $0.5 \times 10^8$ to $500 \times 10^8$ ohms per square, a resistance variation with temperature characterized by an activation energy of less than 0.1 eV, and volume and sheet resistivities which are substantially constant in electric fields up to about 30 kilovolts per centimeter for substantial periods of time at temperatures up to 200° C. In this specification, the values of sheet resistance are for layers which are about 0.01 centimeter thick. To convert these values of sheet resistance to resistivities in ohm-centimeters, the values of sheet resistance are divided by 100.

High-tension insulators comprising ceramic bodies carrying a resistive glaze are described in British Pat. No. 982,600 to D. B. Binns, in U.S. Pat. No. 3,795,499 to Y. Ogawa et al. and in D. B. Binns, *Transactions of the British Ceramic Society* 73 7-17 (1974). Generally, the resistive glazes described in these publications consist essentially of a nonconducting glass matrix containing a conducting network of metal-oxide particles, which particles have, prior to incorporation in the glaze, been suitably doped with impurity ions to enhance the conductivity of the particles. In one family of glazes, tin-oxide particles are doped with antimony oxide as by calcining, and then the doped tin-oxide particles are mixed with an ordinary glass, such as a soda-lime glass or a lead glass, and the mixture is coated and melted to produce the glaze. The sheet resistance of the glazes can be varied within limits by varying the weight ratio of doped tin-oxide particles to glass and by varying the mol ratio of antimony oxide to tin oxide in the doped tin-oxide particles. At low electric fields (less than 1 kilovolt/cm), sheet resistances are reported to be in the range of $10^7$ to $10^{10}$ ohms per square. However, our measurements indicate that, at high-electric fields (10 kilovolts per centimeter and higher) and elevated temperatures, these glazes deteriorate rapidly. For example, after about one hour at about 200° C with a field of 20 kilovolts per centimeter applied, one glaze showed discoloration, pitting and an increase in resistance by a factor of three.

SUMMARY OF THE INVENTION

The invention is based on the discovery that these and other instabilities of glazes in high-electric fields are overcome through two important modifications to the above-described glaze. First, the novel glaze excludes from the glass matrix ions which migrate in the presence of a high-electric field. Second, antimony cations, in a specified range of concentrations, are present in the glass matrix instead of in the tin-oxide particles.

The novel article comprises a substrate carrying a glaze consisting essentially of (a) an inorganic oxide glass matrix that is essentially free of ions which migrate in the presence of a high-electric field, (b) about $1 \times 10^{19}$ to $50 \times 10^{19}$ cations of antimony substantially uniformly distributed in each cubic centimeter of said glass matrix and (c) about 4 to 30 weight percent with respect to the weight of said glaze of discrete particles of tin oxide distributed in said glass matrix.

In preferred forms of the invention, the tin-oxide particles consist essentially of a core that is substantially free of antimony and a thin skin containing antimony.

When a high-electric field is applied to the novel article, the ions present do not redistribute themselves in the glaze. As a result, more stable electrical characteristics are imparted to the article. Also, and unexpectedly, superior electrical properties are obtained by incorporating antimony into the glass matrix instead of into the tin-oxide particles. The novel article may be used in a wide range of applications including high-tension insulators, and in electron guns for cathode-ray tubes as described above.

The novel method comprises dissolving antimony, as a compound thereof, into a glass matrix, mixing together tin-oxide particles and particles of said glass, applying a layer of the mixture to a surface of a substrate and then heating the layer to melt the glass but to retain tin oxide in particulate form. The antimony may be dissolved into the glass either before or after the mixing step. Where desired, electrodes for applying an electric field either along or across the glaze layer may be constructed on the layer.

DETAILED DESCRIPTION OF THE PREFERRED EMBODIMENTS

Figure 1:
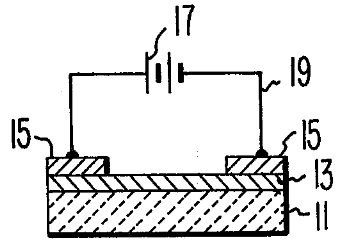
FIG. 1 is a partially-sectional, partially-schematic view of an embodiment of the invention employed as a resistor.

In all of the embodiments, the novel article of manufacture comprises a substrate having a glaze layer on at least a portion of its surface. This may be the entire structure, as in the case of some high-tension insulators. Additional structure may be provided for particular applications, for example, as shown in FIGS. 1 to 4 and described in detail below.

The substrate provides mechanical support but is electrically passive. The substrate may be electrically conducting or electrically insulating. Where it is electrically insulating, it is preferably a ceramic and preferably free from mobile ions, that is, free from ions which migrate under the influence of an electric field. Some mobile ions in ceramic bodies that are to be avoided are lithium, sodium, potassium, rubidium, cesium and lead ions. High-alumina ceramics are preferred, although other ceramics such as steatite and fosterite ceramics may be used as the substrate.

The glaze layer is the active part of the article, providing sheet resistances of about $0.5 \times 10^8$ to $500 \times 10^8$ ohm per square that is stable for substantial time periods in high-electric fields at temperatures up to 200° C. The glaze consists essentially of a glass matrix containing 4 to 30 weight percent with respect to the weight of the glaze of tin-oxide particles. Glazes with 4 to 16 weight percent of tin-oxide particles have sheet resistances of about $0.5 \times 10^8$ to $500 \times 10^8$ ohms per square and can be used as high-field resistors, and in high-tension insulators and resistive lenses for electron guns. Glazes with 25 to 30 percent of tin-oxide particles have sheet resistances below $10^5$ ohms per square and can be used as low-field conductors. In the region of about 20 kilovolts per centimeter, the current-voltage characteristic is of the form I ' $V^n$, where $1.4 < n < 2.9$. Generally, lower values of $n$ are associated with higher concentrations of antimony and larger glass particle sizes in the starting mixture.

The glass matrix of the glaze consists essentially of a glass which is free of ions which migrate in an electric field, particularly fields of about 20 kilovolts per centimeter and higher at temperatures up to 100° C, and contains about $1 \times 10^{19}$ to $50 \times 10^{19}$ antimony cations substantially uniformly distributed in each cubic centimeter of the glass matrix. It is preferred to express the concentration of antimony per unit volume of glass matrix as opposed to per unit volume of glaze. This feature, because of the structure of the glaze, is calculated from the starting materials of the glaze.

Most glasses contain cations which migrate in the glass matrix when an electric field is applied for even short periods of time. With fields of 10 kilovolts/cm and higher, particularly with temperatures above room temperatures, many cations normally used in glass should be avoided. Thus, the glass matrix should be free of the following cations: sodium, potassium, lithium, rubidium, cesium and lead. Table I lists the starting compositions of four barium-aluminum borate glasses which have also been found to be suitable. These glasses were fabricated from chemically-pure oxides, which were melted together, solidified and then reduced to fine powder.

The tin-oxide particles, preferably $SnO_2$, do not contain any deliberately-added impurities as in the prior resistive glazes described above. The tin-oxide particles are about 0.01 to 1.0 micron in average size and may or may not be uniformly distributed in the glass matrix. The proportion of tin oxide in the glaze is calculated from the starting ingredients. However, because of the method of fabrication, it is believed that very little tin oxide is dissolved in the glass matrix and that most of the tin oxide is retained as particles in substantially the sizes as introduced.

Also, because of the method of fabrication, it is believed that some antimony cations in the glass matrix diffuse into a thin surface layer or skin of the tin-oxide particles during the glazing step. This diffusion into the tin-oxide particles is believed to be desirable toward developing stable conductivity in the glaze.

The glaze may be prepared by first mixing tin-oxide particles with particles of an antimony-containing glass or with particles of an antimony compound and particles of glass in the desired proportions with a suitable binder. A surface of a substrate is coated with the mixture, and after drying, the coated substrate is heat treated for a combination of time and temperature for melting the glass and maturing the glaze but not to cause excessive dissolution of tin oxide in the glass or diffusion of antimony into the tin-oxide particles. There are many factors known to a ceramist which influence the maturing of a glaze, and only a few simple trails are necessary to find suitable processing conditions required to produce useful articles.

The glass particles used for producing the mixture for coating are preferably about 1 to 25 microns average size. The larger glass particles produce glazes with fewer conducting paths which carry higher currents which are less highly dependent on the applied voltage. The particles of glass and tin oxide are mixed with suitable solvents and binders to provide the desired homogeneity and viscosity. Then the mixture is coated on a surface of the substrate as by spraying, dipping, doctor blading or other coating method. The coating is of such weight as to provide a glaze thickness after heat treatment of about 25 to 125 microns (1 to 5 mils). The values of sheet resistance herein are for a thickness of 100 microns or 0.01 centimeter. The atmosphere used during heat treatment is preferably air or oxygen; however, an inert atmosphere can also be used. Temperatures and times used during heat treatment are generally about 750° to 1200° C for 5 to 30 minutes.

EXAMPLE 1

Mix together in a vibratory ball mill a batch consisting essentially of 89.75 weight % of glass A, 10 weight % $SnO_2$, 0.25 weight % $Sb_2O_5$ and a polystyrene binder in a solvent. After about one hour of milling, remove the mixture from the mill and doctor blade a layer of the mixture on the surface of a body of an alumina ceramic. After drying the layer, heat the coated ceramic first at about 500° C in air to remove the binder, then at about 800° C in an oxidizing atmosphere for about 10 minutes. Then, cool the heat-treated ceramic to room temperature. The glaze layer has a thickness of about 100 microns (4 mils), a sheet resistance of about $500 \times 10^8$ ohms per square, a volume resistivity of about $5 \times 10^8$ ohm-cm at 20 kV/cm, and a thermal activation energy of about 0.05 eV.

EXAMPLE 2

Follow the procedure of Example 1 except first melt the $Sb_2O_5$ portion with the glass portion in an oxidizing atmosphere above 1000° C. After cooling, reduce the antimony-containing glass to the desired particle size and mix 90 weight % of this glass powder with 10 weight % $SnO_2$ powder.

EXAMPLES 3 to 17

These examples are tabulated in Table II. Test specimens were prepared by doctor blading the indicated formulation on a surface of a 10-mil-thick alumina substrate. The indicated formulation was prepared by milling in a vibratory mill with an alumina ball and an alumina mill body for about one hour using polyisobutyl methacrylate binder and toluene solvent. After drying, the coated substrates were heated slowly to 500° C in air to remove volatile matter, and then heated at the indicated temperatures in air. The heat-treated substrates were cooled to room temperature, and then silver-paste electrodes were applied to spaced positions on the glaze surfaces. The batch formulation, some processing information and the sheet resistances of the glazes are indicated in Table II. Activation energies were determined for examples 5, 6, 8, 14, 15 and 17 and were, respectively, 0.057, 0.052, 0.060, 0.044, 0.28 and 0.096 eV (electron volts).

Example 15 has no added antimony and exhibits a much higher resistivity, by several orders of magnitude, than the other examples in Table II. From the data in Table II, it can be concluded that lower resistivities can be achieved (within limits) with higher antimony concentrations, larger glass-particle sizes and by introducing the antimony as antimony-doped glass.

Figure 3:
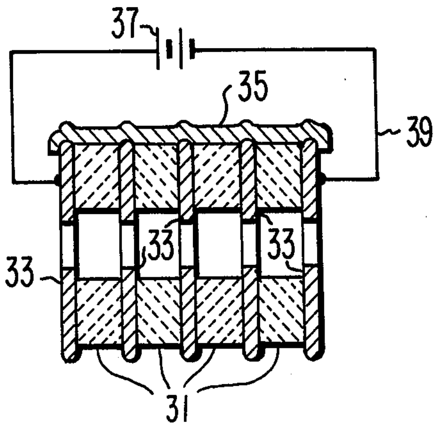
FIG. 3 is a partially-sectional, partially-schematic view of an embodiment of the invention employed to provide an electric field that is graded in discrete steps.

The novel article can be fabricated in many useful forms. As a high-tension insulator, the article need only comprise an insulating ceramic body coated on at least its outer surface with a glaze described herein. For electronic applications, it is usually desirable to apply two or more spaced electrodes to the glaze. Such electrodes are preferably of aluminum, silver, gold or platinum, which may be produced by vapor deposition, FIG. 3 shows an insulating substrate which comprises a stack of alumina-ceramic washer 31 and refractory metal washers 33 joined together into a unitary structure which is cylindrical in shape with a hole therethrough. A stripe of glaze 35 is disposed along the outer side of the cylinder, contacting each of the washers. The refractory metal washers 33 are connected to a voltage source 37 through leads 39. Such structure may be used to provide a stepwise graded resistive lens for an electron gun.

Figure 4:
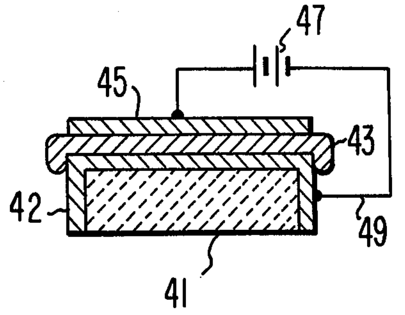
FIG. 4 is a partially-sectional, partially-schematic view of an embodiment of the invention employed to provide a leaky capacitor.

FIG. 4 shows a conducting substrate 42 of a refractory metal coated on a ceramic base 41. A surface of the substrate is coated with a glaze 43 as described herein. A vapor-deposited silver electrode 45 is coated on the surface of the glaze opposite the substrate. A voltage source 47 is connected through leads 49 to the metal coating 42 and the electrode 45. Such structure may be used as a capacitor having controlled leakage which may be time or otherwise related.

Table I

| | Glass Compositions (Mole Parts) | | | |
|---|---|---|---|---|
| Glass | BaO | $Al_2O_3$ | $B_2O_3$ | $SiO_2$ |
| A | 30 | 10 | 40 | 20 |
| B | 30 | 20 | 50 | 0 |
| C | 34 | 20 | 46 | 0 |
| D | 20 | 10 | 15 | 55 |

Table II

| Example | Glass[1] | Weight % Glass | Weight % $SnO_2$ | Form[2] of Sb | Sb Conc.[3] $\times 10^{19}$ | Glass Particle Size μ | Firing[4] Temp. °C | Firing[4] Time Minutes | Sheet Resistance[5] $\times 10^8$ |
|---|---|---|---|---|---|---|---|---|---|
| 3 | A | 90 | 10 | Oxide | 2.4 | 10 | 800 | 10 | 500 |
| 4 | A | 85 | 15 | Oxide | 3.6 | 10 | 800 | 10 | 20 |
| 5 | B | 85 | 15 | Oxide | 8.17 | 10 | 800 | 10 | 420 |
| 6 | B | 85 | 15 | Oxide | 3.60 | 10 | 800 | 10 | 400 |
| 7 | B | 85 | 15 | Oxide | 32.00 | 3 | 800 | 60 | 8 |
| 8 | B | 85 | 15 | Oxide | 9.8 | 3 | 800 | 10 | 160 |
| 9 | B | 88 | 12 | Oxide | 28.0 | 17 | 800 | 20 | 500 |
| 10 | B | 85 | 15 | Oxide | 40.0 | 3 | 800 | 30 | 30 |
| 11 | B | 70 | 30 | Glass | 8.7 | 10 | 800 | 10 | 1 |
| 12 | B | 85 | 15 | Glass | 40.0 | 8 | 800 | 10 | 22 |
| 13 | B | 85 | 15 | Glass | 40.0 | 8 | 800 | 60 | 8 |
| 14 | B | 85 | 15 | Glass | 40.0 | 8 | 800 | 20 | 7 |
| 15 | B | 85 | 15 | None | 0 | 10 | 800 | 60 | 20000 |
| 16 | C | 85 | 15 | Glass | 4.9 | 3 | 800 | 60 | 90 |
| 17 | D | 90 | 10 | Oxide | 2.4 | 10 | 1200 | 10 | 50 |

[1]glass composition indicated in Table I
[2]antimony was introduced either as $Sb_2O_5$ indicated as "oxide" or as antimony-containing glass indicated as "glass"
[3]calculated antimony concentration in glass matrix ofglaze shown as cations per cubic centimeter of glass
[4]all firing in air
[5]sheet resistance in ohms per square at 20 kilovolts per centimeter from a metal resinate after baking in air, from a metal paste such as silver paste, or a colloidal graphite paste.

FIG. 1 shows a simple structure, of the type employed in the examples described above. It comprises an insulating alumina-ceramic substrate 11 which may be a plate sheet of any thickness but preferably about 0.1 to 1.0 cm. thick. A glaze 13 is carried on one surface of the substrate 11. The glaze is preferably about 25 to 125 microns thick. A pair of silver-paste electrodes 15 contacts spaced positions on the glaze 13. The electrodes may be connected to a voltage source 17 through leads 19.

Figure 2:
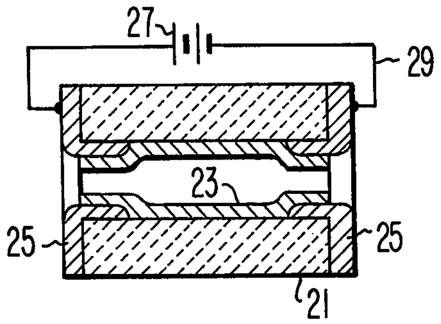
FIG. 2 is a partially-sectional, partially-schematic view of an embodiment of the invention employed to provide a continuously-graded electric field.

FIG. 2 differs from FIG. 1 in several respects. The substrate 21 is cylindrical with a hole therethrough. The electrodes 25 are of platinum deposited from a metal resinate upon the ends of the cylinder and slightly into the hole. The glaze 23 covers the inner surfaces of the hole and slightly up over the electrodes. The electrodes 25 are connected to a voltage source 27 through leads 29. Such structure may be used to provide a continuously-graded resistive lens in an electron gun.

We claim:

1. An article of manufacture comprising a substrate carrying a layer of glaze consisting essentially of (a) an inorganic oxide glass matrix that is essentially free from ions which migrate in the presence of a highelectric field of 10 kilovolts per centimeter and higher, (b) about $1 \times 10^{19}$ to $50 \times 10^{19}$ antimony cations substantially uniformly distributed in each cubic centimeter of said glass matrix, and (c) about 4 to 30 weight % with respect to the weight of said glaze of discrete particles of tin oxide in said glass matrix.

2. The article defined in claim 1 wherein said tin-oxide particles consist essentially of a core that is substantially free of antimony and a thin skin containing antimony cations.

3. The article defined in claim 1 containing 4 to 16 weight % tin-oxide particles with respect to the weight of said glaze.

4. The article defined in claim 1 containing 25 to 30 weight % tin-oxide particles with respect to the weight of said glaze.

5. The article defined in claim 1 including means for applying a voltage to at least a portion of said glaze layer.

6. The article defined in claim 1 wherein said substrate is a body of electrically-insulating ceramic material that is substantially free of alkali-metal cations, and said glaze layer is up to 125 microns thick.

7. The article defined in claim 1 wherein said substrate is a body of electrically-insulating material that is essentially free of ions which migrate in the presence of an applied electric field.

* * * * *

UNITED STATES PATENT OFFICE
CERTIFICATE OF CORRECTION

PATENT NO. : 4,091,144

DATED : May 23, 1978

INVENTOR(S) : Joseph Dresner and Kenneth Warren Hang

It is certified that error appears in the above-identified patent and that said Letters Patent are hereby corrected as shown below:

| | |
|---|---|
| Column 1, line 17 | change "cathoderay" to --cathode-ray-- |
| Column 3, line 27 | change "I' $v^n$" to --$I \propto V^n$-- |
| Column 6, line 2 | change "washer" to --washers-- |
| Column 6, line 54 | change "highelectric" to --high-electric-- |

Signed and Sealed this

*Nineteenth* Day of *September 1978*

[SEAL]

*Attest:*

RUTH C. MASON
*Attesting Officer*

DONALD W. BANNER
*Commissioner of Patents and Trademarks*